US012650802B2

(12) United States Patent
Kobayashi

(10) Patent No.: US 12,650,802 B2
(45) Date of Patent: Jun. 9, 2026

(54) HEAD-MOUNTED DISPLAY CONTROL APPARATUS, METHOD FOR CONTROLLING HEAD-MOUNTED DISPLAY CONTROL APPARATUS, AND NON-TRANSITORY COMPUTER READABLE STORAGE MEDIUM

(71) Applicant: CANON KABUSHIKI KAISHA, Tokyo (JP)

(72) Inventor: Masaaki Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 109 days.

(21) Appl. No.: 18/511,788

(22) Filed: Nov. 16, 2023

(65) Prior Publication Data

US 2024/0168701 A1 May 23, 2024

(30) Foreign Application Priority Data

Nov. 18, 2022 (JP) ................................. 2022-184911

(51) Int. Cl.
| | |
|---|---|
| *G06F 3/147* | (2006.01) |
| *H04M 1/72409* | (2021.01) |
| *H04N 13/239* | (2018.01) |
| *H04N 13/344* | (2018.01) |
| *H04N 13/398* | (2018.01) |

(52) U.S. Cl.
CPC ....... *G06F 3/147* (2013.01); *H04M 1/724097* (2022.02); *H04N 13/239* (2018.05); *H04N 13/344* (2018.05); *H04N 13/398* (2018.05)

(58) Field of Classification Search
CPC ............. G06F 3/147; H04M 1/724097; H04N 13/239; H04N 13/344; H04N 13/398; H04N 13/122; H04N 13/334; G09G 2354/00
See application file for complete search history.

(56) References Cited

U.S. PATENT DOCUMENTS

| | | | |
|---|---|---|---|
| 10,324,294 B2 | 6/2019 | Tsukahara et al. | |
| 11,590,415 B2* | 2/2023 | Raghoebardajal | ...... G06F 3/012 |
| 2016/0035138 A1* | 2/2016 | Kim | ......................... G06T 1/20 |
| | | | 345/633 |
| 2016/0337612 A1* | 11/2016 | Im | ......................... H04N 23/635 |
| 2019/0279407 A1* | 9/2019 | McHugh | ................. G06F 3/011 |
| 2019/0320138 A1* | 10/2019 | Kaufthal | .............. G06V 40/168 |
| 2020/0042098 A1* | 2/2020 | Joo | ..................... G02B 27/0093 |
| 2022/0392169 A1* | 12/2022 | Simpson | ............... A63F 13/212 |
| 2023/0056988 A1* | 2/2023 | Welch | .................. H04N 21/262 |
| 2023/0137199 A1* | 5/2023 | Xiong | .................. G09G 3/2003 |
| | | | 345/633 |

* cited by examiner

*Primary Examiner* — Bryan Earles
(74) *Attorney, Agent, or Firm* — Canon U.S.A., Inc., IP Division

(57) ABSTRACT

A head-mounted display control apparatus includes one or more circuits, or one or more processors and at least one memory, the at least one memory being coupled to the one or more processors and having stored thereon instructions executable by the one or more processors. At least one of the one or more circuits or the execution of the instructions causes the head-mounted display control apparatus to function as an image capturing unit configured to capture an image; and a control unit configured to, based on phone call reception information, phone conversation information, or message reception information, perform control to display the captured image or a virtual space image on a display unit.

15 Claims, 5 Drawing Sheets

5010                                    5001

Video see-through ON

Call from AAA

Accept                          Decline 5003                            5004

5020                                    5002

Video see-through OFF

Call from AAA

Accept                          Decline 5003                            5004

HEAD-MOUNTED DISPLAY CONTROL APPARATUS, METHOD FOR CONTROLLING HEAD-MOUNTED DISPLAY CONTROL APPARATUS, AND NON-TRANSITORY COMPUTER READABLE STORAGE MEDIUM

BACKGROUND

Technical Field

The present disclosure relates to a head-mounted display control apparatus, a method for controlling the head-mounted display control apparatus, and a non-transitory computer readable storage medium.

Description of the Related Art

In recent years, XR information processing terminals of a head-mounted display (HMD) type have become widespread. XR is a generic term for virtual reality (VR), augmented reality (AR), and mixed reality (MR).

HMD XR information processing terminals include those of a see-through type in which computer graphics (CG) are displayed on a transmissive display, and those of a non-see-through type in which CG and a real image captured by a camera are displayed on a non-transmissive display. In a see-through display, a person wearing an HMD is able to determine the state of a real space. In a non-see-through display, the person is unable to determine the state of a real space but is highly immersed in a VR space. However, there is a non-see-through display in which the state of a real space can be determined by displaying an image captured by a camera built in the HMD on the display. A state in which a real space is displayed is called a video see-through mode, relative to a state in which a VR space is displayed.

A smartphone compatible with the headset profile (HSP) or the hands-free profile (HFP) of Bluetooth (registered trademark) and an audio terminal such as a headset enable a phone conversation with the audio terminal instead of a microphone and a speaker of the smartphone. The HSP is the specifications of the function of transmitting and receiving audio data between a smartphone and an audio terminal. The HFP is the specifications of the function of making and receiving phone calls.

U.S. patent Ser. No. 10/324,294 discloses that the reception of a message or a phone call in an external smartphone is indicated by an icon in an HMD.

SUMMARY

A head-mounted display control apparatus includes one or more circuits, or one or more processors and at least one memory, the at least one memory being coupled to the one or more processors and having stored thereon instructions executable by the one or more processors. At least one of the one or more circuits or the execution of the instructions causes the head-mounted display control apparatus to function as an image capturing unit configured to capture an image; and a control unit configured to, based on phone call reception information, phone conversation information, or message reception information, perform control to display the captured image or a virtual space image on a display unit.

Further features of the present disclosure will become apparent from the following description of exemplary embodiments with reference to the attached drawings.

DESCRIPTION OF THE EMBODIMENTS

First Embodiment

In the above-described related art, when a phone call is received in a real space while a virtual space is displayed on a non-see-through head-mounted display (HMD), the situation of the real space, for example, whether there is another person, is unrecognizable, and it is impossible to immediately determine whether a phone conversation can be started.

The present disclosure provides a technique of enabling a captured image to be displayed, for example, when a phone call is being received.

Figure 1:
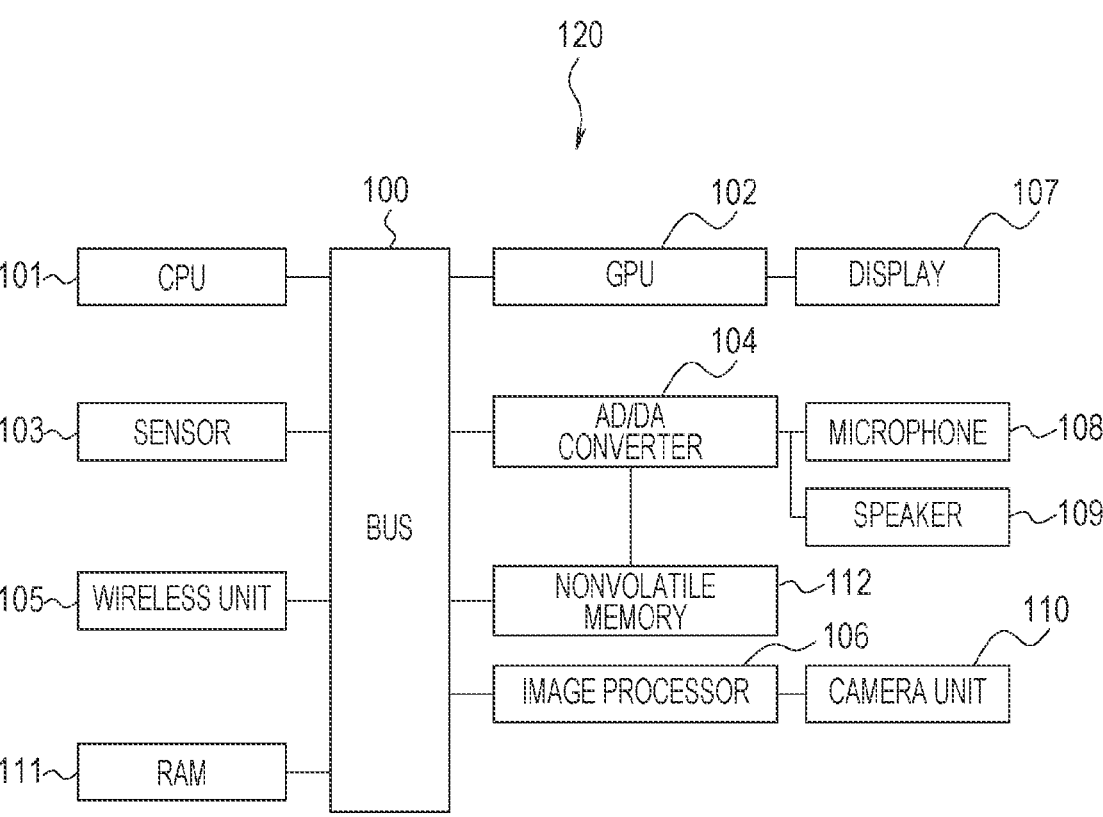
FIG. 1 is a diagram illustrating an example configuration of a head-mounted display (HMD).

FIG. 1 is a diagram illustrating an example configuration of a head-mounted display (HMD) 120 according to a first embodiment. The HMD 120 is an example of a display control apparatus that responds to a phone call reception signal. The HMD 120 includes a bus 100, a central processing unit (CPU) 101, a graphics processing unit (GPU) 102, a posture sensor 103, an analog-to-digital/digital-to-analog (AD/DA) converter 104 for audio, and a wireless unit 105. The HMD 120 further includes an image processor 106, a display 107, a microphone 108, a speaker 109, a camera unit 110, a random access memory (RAM) 111, and a nonvolatile memory 112.

Next, the roles of the individual components will be described. The bus 100 manages the data flow in the HMD 120. The CPU 101 executes a program stored in the nonvolatile memory 112 or the like to control the entire HMD 120, and executes system software and application software. In addition, the CPU 101 analyzes a digital audio signal to determine whether the digital audio signal is a phone call reception sound.

The GPU 102 generates a virtual reality image and outputs data of the image to the display 107. The posture sensor 103 includes a gyro sensor and an acceleration sensor, and acquires information regarding the posture and position of the HMD 120. In the present embodiment, the CPU 101 processes raw data received from the posture sensor 103 and acquires information regarding the posture and position of the HMD 120. The information regarding the posture and position is reflected in generation of a virtual reality image. That is, the HMD 120 generates a virtual reality image corresponding to the forward direction of the HMD 120 in accordance with a motion of the HMD 120 including the posture sensor 103, and displays the virtual reality image on the display 107.

The AD/DA converter 104 converts an analog audio signal received from the microphone 108 into a digital audio signal, converts the digital audio signal into an analog audio signal, and outputs the analog audio signal to the speaker 109. The wireless unit 105 is capable of connecting to another terminal by using a plurality of wireless standards (Bluetooth, Wi-Fi, and the like) to transmit and receive data. Specifically, the wireless unit 105 connects to a controller device to acquire operation information, or connects to a smartphone to transmit and receive audio data and acquire phone call reception information.

The image processor 106 acquires mosaic image data from the camera unit 110 and performs demosaicing and color correction processing. The display 107 displays a real space image captured by the camera unit 110 or a virtual reality image generated by the GPU 102. Which is to be displayed on the display 107 is controlled by the CPU 101. The logic of the control will be described below. The display 107 includes two panels, one is for the right eye and the other is for the left eye, and displays an input stereo image on the panels such that the stereo image is divided into partial images for the respective panels. A monocular image can also be input to the display 107. In this case, the same image is displayed on the panels for the right eye and the left eye. Switching of the image to be displayed on the display 107 is controlled by the CPU 101.

The microphone 108 physically acquires a sound and converts the sound into an analog electric signal. The speaker 109 outputs an analog signal as a physical sound.

The camera unit 110 includes two lenses and two sensors, is disposed so as to be capable of capturing images for the positions of the two eyes of the user wearing the HMD 120, and outputs captured and digitalized mosaic image data to the image processor 106. The image processor 106 combines the images received from the two sensors of the camera unit 110 into one stereo image. When the distance between the centers of the lenses of the camera unit 110 is different from the distance between the eyes of the user, the image processor 106 may correct a display image so that the user's perception of depth coincides with the reality.

The RAM 111 loads a program and data stored in the nonvolatile memory 112 at the startup of the HMD 120 and functions as a work area for the CPU 101. The RAM 111 stores an acquired image and a generated image. The nonvolatile memory 112 stores a program and data. These operations are successively performed, and the user is able to view a moving image.

Figure 2:
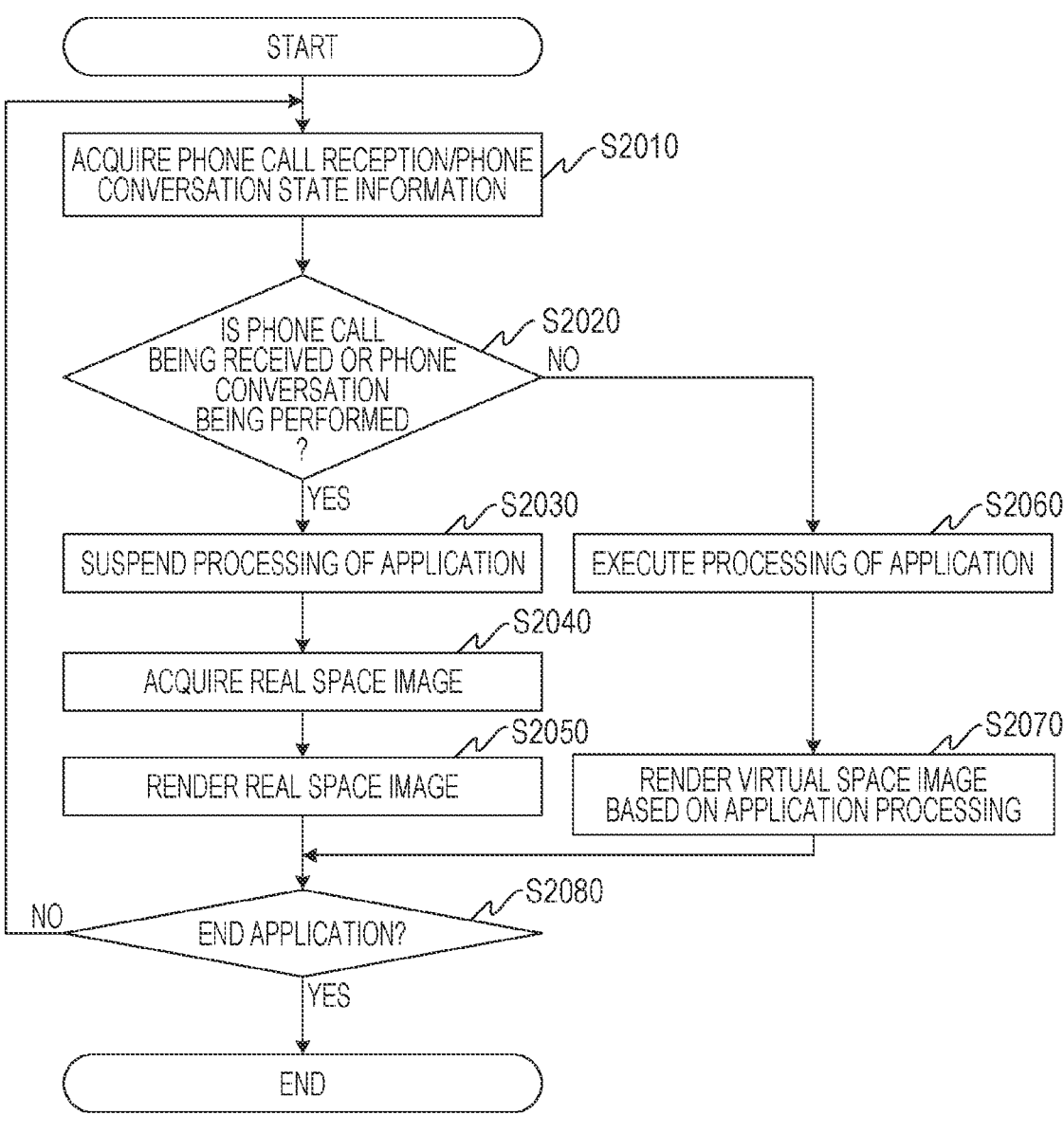
FIG. 2 is a flowchart illustrating a method for controlling the HMD according to a first embodiment.

FIG. 2 is a flowchart illustrating a method for controlling the HMD 120 according to the first embodiment, and describes a phone call reception operation of the HMD 120 that responds to reception of a phone call. The steps are performed in the order indicated by the arrows in FIG. 2 unless otherwise stated. If the input and output of data in the individual steps do not depend on each other, the steps may be performed in a different order. The individual steps are performed by the CPU 101, but part of processing, such as rendering processing, is performed by another processor such as the GPU 102. In the present embodiment, a description will be given under the assumption that a VR game application is being executed.

In step S2010, the CPU 101 acquires phone call reception/ phone conversation state information via the wireless unit 105. In the present embodiment, a smartphone connected to the HMD 120 via the wireless unit 105 transmits phone call reception/phone conversation state information to the HMD 120, and thereby the CPU 101 acquires the phone call reception/phone conversation state information via the wireless unit 105.

In step S2020, the CPU 101 determines, based on the phone call reception/phone conversation state information, whether a phone call is being received or a phone conversation is being performed. If a determination is made that a phone call is being received or a phone conversation is being performed, the process proceeds to step S2030. Otherwise, the process proceeds to step S2060.

In step S2030, the CPU 101 suspends the processing of the above-described application that is being executed. In the present embodiment, the CPU 101 causes the game application to pause and causes the system to perform control.

In step S2040, the CPU 101 acquires a real space image by using the camera unit 110 and the image processor 106. The real space image is captured by the camera unit 110 built in the HMD 120 and is a stereo image of a region in front of the HMD 120.

In step S2050, the CPU 101 renders the real space image. Specifically, the CPU 101 converts the format of the image acquired in step S2040 into a format suitable for the display 107, and transmits the converted stereo image data to the display 107 via the GPU 102. The stereo image is displayed on the display 107. In step S2050, the CPU 101 also performs processing of waiting in synchronization with a video signal. Subsequently, the process proceeds to step S2080.

In step S2060, the CPU 101 executes the processing of the above-described application. In the present embodiment, the CPU 101 executes processing for one frame and creates application data that is necessary for generating rendering data. In a case where the processing of the application is executed in another thread, the application data may be acquired in synchronization with the processing of the other thread.

In step S2070, the CPU 101 renders a virtual space image that is based on the application processing. The CPU 101 transmits, based on the application data generated in step S2050 and information from the posture sensor 103, an image of a virtual space in front to the display 107 via the GPU 102. The virtual space image is displayed on the display 107. In step S2070, the CPU 101 also performs processing of waiting in synchronization with a video signal. The virtual space image may be a stereo image that is based on computer graphics or may be a stereo image actually captured by using a stereo fish eye lens. Subsequently, the process proceeds to step S2080.

In step S2080, the CPU 101 determines whether to end the application. If a determination is made that the application is not to be ended, the process returns to step S2010. If a determination is made that the application is to be ended, the process of the flowchart illustrated in FIG. 2 ends.

Typically, the user holds a controller in his/her hand and does not hold a smartphone when playing a game. In the present embodiment, in response to receipt of a phone call in the real space, the CPU 101 proceeds to step S2030, automatically performs switching to a video see-through mode, and displays a real space image. Accordingly, the user is able to view the real space, immediately find his/her smartphone around him/her, operate the smartphone, and answer the phone call, without taking off the HMD 120. In addition, the user is able to easily determine whether to answer the phone call or whether to avoid an important topic in a phone conversation by determining whether there is somebody around him/her.

In the present embodiment, the microphone and speaker used for a phone conversation by the user are not limited. The user may use the microphone 108 and the speaker 109 of the HMD 120, and the HMD 120 may transmit/receive audio information to/from the smartphone. Alternatively, the user may use a microphone and a speaker built in the smartphone to perform a phone conversation.

In the present embodiment, an example is illustrated in which the user operates his/her smartphone to answer an incoming call. The CPU 101 may display a phone call answering screen on the display 107 of the HMD 120 and may transmit/receive audio information to/from the smartphone. In this case, the user performs a phone conversation by using the microphone 108 and the speaker 109 of the HMD 120.

In the present embodiment, a description has been given under the assumption that the target application is a game application. The target application is not limited thereto and may be any application, such as a VR moving image player, a work support application, or a virtual office application. In a VR moving image player, the CPU 101 decodes video data to generate a frame image and renders the frame image as a virtual reality image.

In the present embodiment, a description has been given of a phone conversation. When the smartphone receives a message, the CPU 101 may perform switching to the video see-through mode.

In the present embodiment, the phone call that is received may be a phone call received by either a smartphone connected to a public line or a phone conversation application of the system. However, in a case where users communicate with each other in a game application or the like, a screen is not automatically switched in response to receipt of a phone call within the application.

In the present embodiment, a display image is switched in accordance with only whether a phone call is being received. The HMD 120 is equipped with various sensors and a camera. The CPU 101 may use information obtained therefrom to detect whether there is a person near the user, may proceed to step S2030 if a phone call is being received and there is a person near the user, and may switch the display of a real space image.

In the present embodiment, the CPU 101 generates a virtual reality image corresponding to the forward direction of the HMD 120 in accordance with a motion of the HMD 120 including the posture sensor 103. Alternatively, the posture sensor 103 need not be included, and an image in a fixed direction may be displayed.

Although a stereo image is handled in the present embodiment, a monocular image may be handled instead of a stereo image.

In the present embodiment, the CPU 101 performs switching to display of a real space image in response to receipt of a phone call, but the present disclosure is not limited thereto. For example, the CPU 101 may display a virtual space image and a real space image in combination, or may make a small window on a virtual space image in response to receipt of a phone call and display a real space image in the video see-through mode only in the small window.

As described above, the camera unit 110 and the image processor 106 function as an image capturing unit, which captures an image. The display 107 is an example of a display unit. In step S2010, the CPU 101 acquires phone call reception information, phone conversation information, or message reception information from an external apparatus. The external apparatus is a smartphone, for example. The CPU 101 functions as a control unit, and performs control to display a captured image or a virtual space image on the display 107, based on the phone call reception information, the phone conversation information, or the message reception information.

When a phone call is not being received or a phone conversation is not being performed, the CPU 101 performs control to display a virtual space image on the display 107 in step S2070. When a phone call is being received or a phone conversation is being performed, the CPU 101 performs control to display a captured image on the display 107 in step S2050.

In step S2050, the CPU 101 may perform control to display a captured image and a virtual space image on the display 107. For example, the CPU 101 is capable of displaying a captured image and a virtual space image in combination, or displaying a captured image in a small window on a virtual space image.

The present embodiment may be applied to reception of a message in a smartphone. When no message is received, the CPU 101 may perform control to display a virtual space image on the display 107. When a message is received, the CPU 101 may perform control to display a captured image on the display 107 for a predetermined period. When a message is received, the CPU 101 may perform control to display a captured image and a virtual space image on the display 107 for a predetermined period, similarly to the above.

When a person different from a person wearing the HMD 120 is present within a predetermined range, the CPU 101 may perform control to display a captured image or a virtual space image on the display 107, based on phone call reception information, phone conversation information, or message reception information.

As described above, according to the present embodiment, the user is able to determine the situation of a real space and immediately determine whether he/she can start a phone conversation, without taking off the HMD 120.

Second Embodiment

Figure 3:
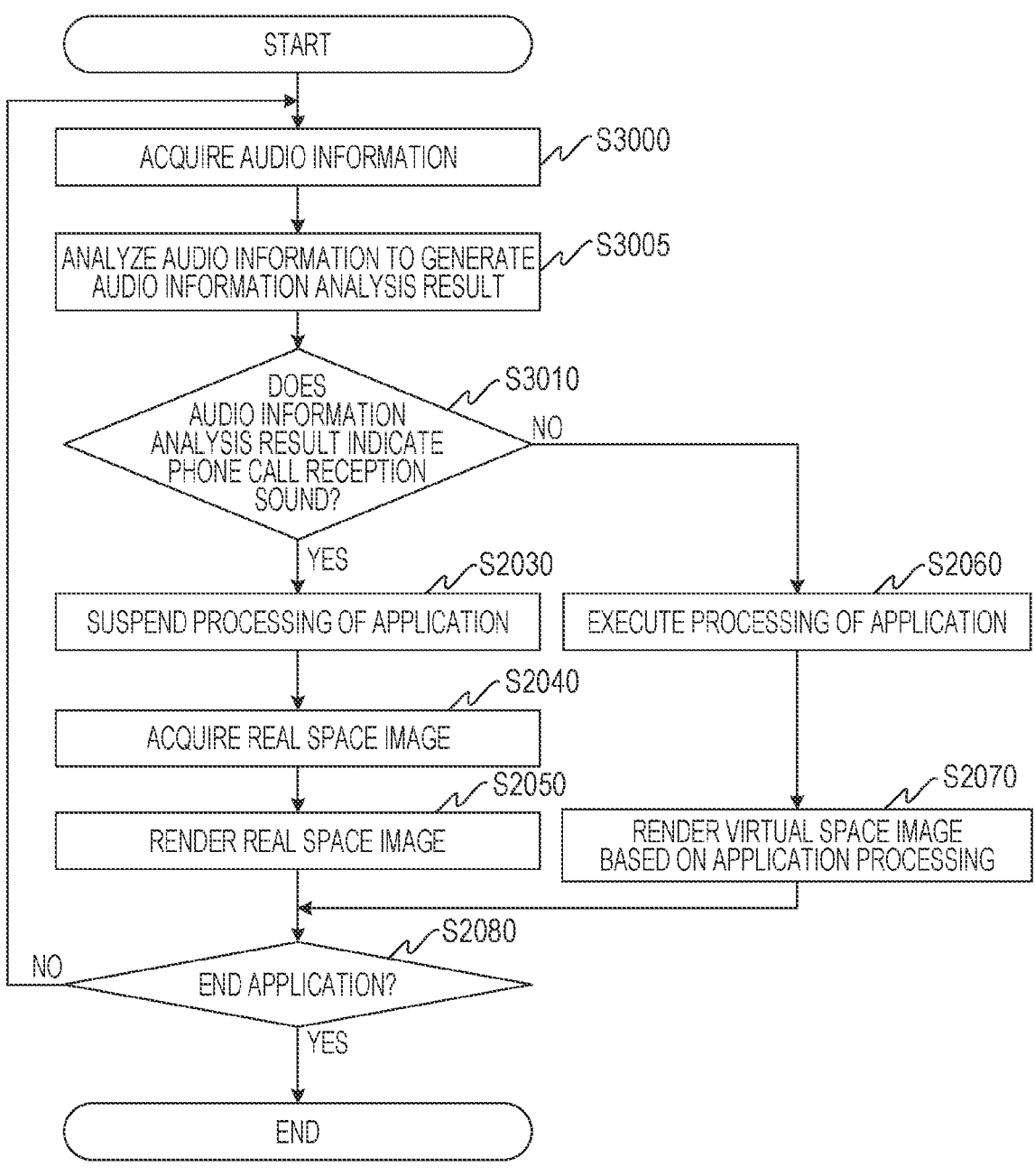
FIG. 3 is a flowchart illustrating a method for controlling the HMD according to a second embodiment.

FIG. 3 is a flowchart illustrating a method for controlling the HMD 120 according to a second embodiment, and describes a phone call reception operation of the HMD 120 that responds to reception of a phone call. FIG. 3 is different from FIG. 2 in that steps S3000, S3005, and S3010 are provided instead of steps S2010 and S2020. The operation is the same as in the first embodiment unless otherwise stated.

In step S3000, the CPU 101 acquires audio information via the microphone 108 and the AD/DA converter 104. The audio information is acquired as digital audio data, which is generated by AD converting a sound received by the microphone 108 built in the HMD 120 by using the AD/DA converter 104. The CPU 101 acquires audio data for 10 seconds before the time point at which step S3000 is performed.

In step S3005, the CPU 101 analyzes the audio information acquired in step S3000 to generate an audio information analysis result. In the present embodiment, the CPU 101 performs fast Fourier transform (FFT) on the audio information to acquire information in a range of 15 Hz to 16 kHz as an analysis result.

In step S3010, the CPU 101 determines whether the audio information analysis result generated in step S3005 indicates a phone call reception sound. If the audio information analysis result indicates a phone call reception sound, the process proceeds to step S2030. Otherwise, the process proceeds to step S2060. In the present embodiment, if the sound pressure of the peak of at least one frequency is 60 dB or more as a result of FFT, the CPU 101 determines that the audio information analysis result indicates a phone call reception sound. The peak may be determined in the following manner. For example, if there is an amplitude ten times the median of the amplitude in a Log scale of the FFT result, it is determined that there is a peak.

In the present embodiment, the CPU 101 is capable of detecting a phone call reception sound of a smartphone by using the microphone 108 in an analog manner and performing switching to the video see-through mode in step S2050, even if the CPU 101 is incapable of digitally transmitting/receiving a signal via the wireless unit 105. The present embodiment is capable of obtaining a merit similar to that of the first embodiment.

In the present embodiment, a result of FFT in the range of 15 Hz to 10 kHz is regarded as an audio analysis result, but the present disclosure is not limited thereto. Alternatively, the number of successive identical patterns may be calculated with respect to a time-series change in waveform, and if the number is two or more, the successive identical patterns may be determined to be a phone call reception sound. Regarding this, a warning sound such as a fire alarm sound often has audio information having repetition of an identical pattern, and causes automatic switching to the video see-through mode. This is an effective operation in terms of being able to notice the occurrence of a warning sound and visually recognize the cause of the occurrence. A phone call reception sound may be recorded in advance, and whether a sound is identical to the recorded phone call reception sound may be determined. Accordingly, even if a melody is set as a phone call reception sound, the melody can be determined to be a phone call reception sound.

As described above, the CPU 101 performs control to display a captured image or a virtual space image on the display 107, based on a phone call reception sound or a message reception sound collected by the microphone 108.

Third Embodiment

Figure 4:
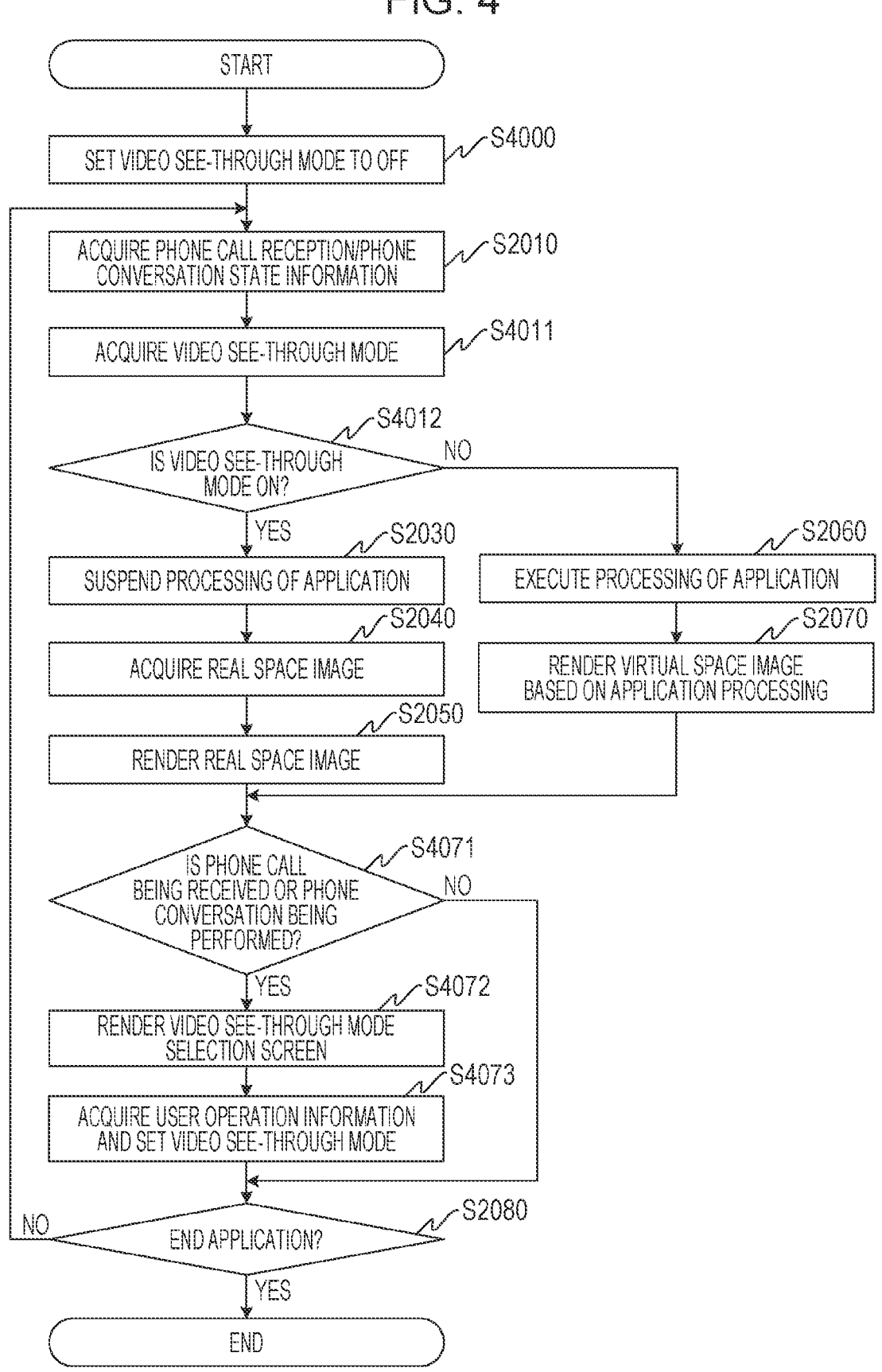
FIG. 4 is a flowchart illustrating a method for controlling the HMD according to a third embodiment.

FIG. 4 is a flowchart illustrating a method for controlling the HMD 120 according to a third embodiment, and describes a phone call reception operation of the HMD 120 that responds to reception of a phone call. FIG. 4 is different from FIG. 2 in that step S2020 is deleted and steps S4000, S4011, S4012, and S4071 to S4073 are added. The operation is the same as in the first embodiment unless otherwise stated.

In step S4000, the CPU 101 sets the video see-through mode to OFF. This corresponds to setting of an initial state.

In step S2010, the CPU 101 acquires phone call reception/phone conversation state information via the wireless unit 105.

In step S4011, the CPU 101 acquires a video see-through mode. Specifically, the CPU 101 acquires the video see-through mode set in step S4000 described above or step S4073 described below.

In step S4012, the CPU 101 determines whether the video see-through mode is ON. If the video see-through mode is ON, the process proceeds to step S4071 via steps S2030 to S2050. If the video see-through mode is OFF, the process proceeds to step S4071 via steps S2060 and S2070.

In step S4071, the CPU 101 determines, based on the phone call reception/phone conversation state information acquired in step S2010, whether a phone call is being received or a phone conversation is being performed. If a determination is made that a phone call is being received or a phone conversation is being performed, the process proceeds to step S4072. Otherwise, the process proceeds to step S2080.

In step S4072, the CPU 101 renders a video see-through mode selection screen. In a state in which the video see-through mode is OFF, the CPU 101 displays, on the display 107 via the GPU 102, a video see-through mode selection screen 5010 illustrated in FIG. 5A such that the video see-through mode selection screen 5010 is superimposed on a virtual space image. Accordingly, the user views the video see-through mode selection screen 5010 floating in a three-dimensional space. The video see-through mode selection screen 5010 includes a video see-through ON button 5001, an accept button 5003, and a decline button 5004. The video see-through ON button 5001 is a button for switching the video see-through mode from OFF to ON.

Figures 5A, 5B:
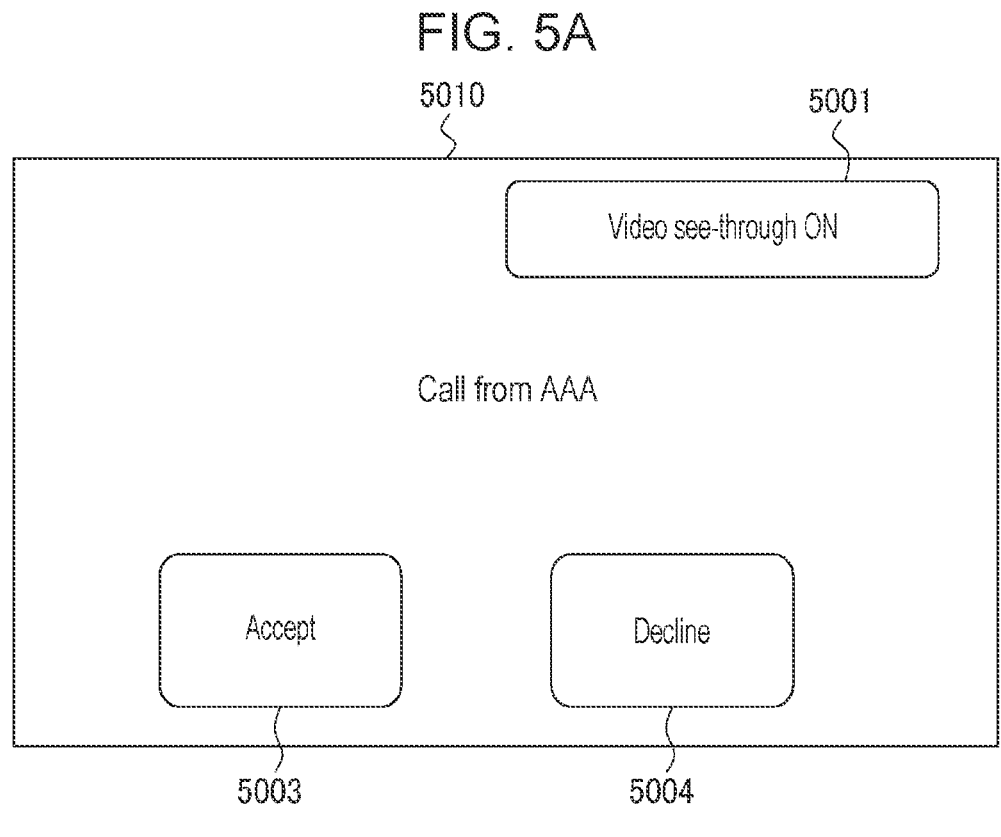
FIGS. 5A and 5B are each a diagram for describing a user interface screen displayed when a phone call is being received.

In a state in which the video see-through mode is ON, the CPU 101 displays, on the display 107 via the GPU 102, a video see-through mode selection screen 5020 illustrated in FIG. 5B such that the video see-through mode selection screen 5020 is superimposed on a real space image. The video see-through mode selection screen 5020 includes a video see-through OFF button 5002, the accept button 5003, and the decline button 5004. The video see-through OFF button 5002 is a button for switching the video see-through mode from ON to OFF.

The user presses a button on the video see-through mode selection screen 5010 or 5020 by using a controller or his/her finger. In response to the accept button 5003 or the decline button 5004 being pressed, the CPU 101 starts or declines a phone conversation.

In step S4073, the CPU 101 acquires user operation information and sets the video see-through mode. In response to the video see-through ON button 5001 being pressed, the CPU 101 sets the video see-through mode to ON. In response to the video see-through OFF button 5002 being pressed, the CPU 101 sets the video see-through mode to OFF.

In step S2080, the CPU 101 determines whether to end the application. If a determination is made that the application is not to be ended, the process returns to step S2010. If a determination is made that the application is to be ended, the process of the flowchart illustrated in FIG. 4 ends.

According to the present embodiment, in response to receipt of a phone call, the CPU 101 displays the video see-through mode selection screen 5010 or 5020 for allowing the user to switch ON or OFF the vide see-through mode, instead of immediately setting the video see-through mode to ON. In accordance with a selection result made on the video see-through mode selection screen 5010 or 5020, the CPU 101 switches ON or OFF the video see-through mode. Accordingly, a sudden change of the entire screen (the space to the user) unintended by the user can be prevented. In the present embodiment, the CPU 101 changes the screen in response to pressing of the video see-through ON button 5001. Alternatively, the CPU 101 may change the screen in response to pressing of the accept button 5003.

As described above, if a determination is made in step S4071 that a phone call is being received or a phone conversation is being performed, the process proceeds to step S4072. In step S4072, the CPU 101 performs control to display an instruction button on the display 107 such that the instruction button is superimposed on a virtual space image. The instruction button is the video see-through ON button 5001 or the accept button 5003.

In step S4073, if an operation instruction for the instruction button is provided, the CPU 101 performs control to display an image captured by the camera unit 110 on the display 107. If an operation instruction for the instruction button is provided, the CPU 101 may perform control to display an image captured by the camera unit 110 and a virtual space image on the display 107. If an operation instruction for the instruction button is not provided, the CPU 101 performs control to display a virtual space image on the display 107.

Other Embodiments

The present disclosure can be implemented by a process in which a program implementing one or more functions of the above-described embodiments is supplied to a system or an apparatus via a network or a storage medium and one or more processors in the system or the apparatus read and execute the program. The present disclosure can also be implemented by a circuit that implements one or more functions (for example, an application specific integrated circuit (ASIC)).

The above-described embodiments are merely specific examples for implementing the present disclosure, and the technical scope of the present disclosure is not to be interpreted in a limited manner based on these embodiments. That is, the present disclosure can be implemented in various ways without departing from the technical spirit thereof or the main features thereof.

According to the present disclosure, it is possible to display a captured image, for example, when a phone call is being received.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-184911, filed Nov. 18, 2022, which is hereby incorporated by reference herein in its entirety.

What is claimed is:

1. A head-mounted display control apparatus that is in communication with an external apparatus comprising:

at least one camera that captures images of a real space;

at least one memory having stored thereon instructions;

one or more processors that executes the stored instructions and is configured to:

receive information output by the external apparatus and determine if the output information represents any of phone call reception information, phone conversation information, or message reception information; and perform control to display, on a display of the head-mounted display, a selection screen within virtual space image that (i) includes options for starting or refusing a phone call, and switching ON or OFF a video see-through mode, and (ii) controls the at least one camera to begin capture images of real space and suspend an application that is rendering the virtual space image.

2. The head-mounted display control apparatus according to claim 1, wherein execution of the stored instructions further configures the one or more processors to:

when it is determined that the received information output by the external apparatus is not a phone call or is not a phone conversation being performed, perform control to display the virtual space image on the display of the head-mounted display, and when it is determined that the received information output by the external apparatus indicates a phone call is being received or a phone conversation is being performed, and a selection from within the selection screen is made to cause capturing of the real space image, perform control to display the captured real space image on the display of the head-mounted display.

3. The head-mounted display control apparatus according to claim 1, wherein execution of the stored instructions further configures the one or more processors to:

when it is determined that the received information output by the external apparatus is not a phone call is being received or is not a phone conversation being performed, perform control to display the virtual space image on the display of the head-mounted display, and when it is determined that the received information output by the external apparatus indicates a phone call is being received or a phone conversation is being performed, perform control to display the captured image and the virtual space image on the display of the head-mounted display.

4. The head-mounted display control apparatus according to claim 1, wherein execution of the stored instructions further configures the one or more processors to:

when it is determined that the received information output by the external apparatus indicates that no message is received, perform control to display the virtual space image on the display of the head-mounted display, and when it is determined that the received information output by the external apparatus indicates a message is received, perform control to display the captured image on the display of the head-mounted display for a predetermined period.

5. The head-mounted display control apparatus according to claim 1, wherein execution of the stored instructions further configures the one or more processors to:

when it is determined that the received information output by the external apparatus indicates that no message is received, perform control to display the virtual space image on the display of the head-mounted display, and when it is determined that the received information output by the external apparatus indicates that a message is received, perform control to display the captured image and the virtual space image on the display of the head-mounted display for a predetermined period.

6. The head-mounted display control apparatus according to claim 1, wherein execution of the stored instructions further configures the one or more processors to:

when a person different from a person wearing the head-mounted display control apparatus is present within a predetermined range, perform control to display the captured image or the virtual space image on the display of the head-mounted display, based on the phone call reception information, the phone conversation information, or the message reception information.

7. The head-mounted display control apparatus according to claim 1, wherein execution of the stored instructions further configures the one or more processors to:

acquire the phone call reception information, the phone conversation information, or the message reception information from an external apparatus.

8. The head-mounted display control apparatus according to claim 1, wherein execution of the stored instructions further configures the one or more processors to determine that the received information from the external apparatus represents any of phone call reception information, phone conversation information, or message reception information based on a phone call reception sound or a message reception sound sensed by a sensor of the head mount display and perform control to display the selection screen on the display of the head mount display.

9. The head-mounted display control apparatus according to claim 8, wherein the phone call reception sound or the message reception sound is a phone call reception sound or a message reception sound collected by a microphone.

10. The head-mounted display control apparatus according to claim 2, wherein execution of the stored instructions further configures the one or more processors to:

when it is determined that the received information output by the external apparatus indicates that a phone call is being received or a phone conversation is being performed, and an instruction is provided via the selection screen, perform control to display the captured image on the display of the head-mounted display, and when it is determined that the received information output by the external apparatus indicates that a phone call is being received or a phone conversation is being performed, and no instruction is provided via the selection screen, perform control to display the virtual space image on the display of the head-mounted display.

11. The head-mounted display control apparatus according to claim 10, wherein execution of the stored instructions further configures the one or more processors to:

when it is determined that the received information output by the external apparatus indicates that a phone call is being received or a phone conversation is being performed, perform control to display an instruction button on the selection screen being displayed such that the instruction button is superimposed on the virtual space image, when it is determined that the received information output by the external apparatus indicates that a phone call is being received or a phone conversation is being performed, and an operation instruction for the instruction button is provided via the selection screen, perform control to display the captured image on the display of the head-mounted display, and when it is determined that the received information indicates that a phone call is being received or a phone conversation is being performed, and no operation instruction for the instruction button is provided via the selection screen, perform control to display the virtual space image on the display of the head-mounted display.

12. The head-mounted display control apparatus according to claim 3, execution of the stored instructions further configures the one or more processors to:

when it is determined that the received information output by the external apparatus indicates that a phone call is being received or a phone conversation is being performed, and an instruction is provided via the selection screen, perform control to display the captured image and the virtual space image on the display of the head-mounted display, and when it is determined that the received information output by the external apparatus indicates that a phone call is being received or a phone conversation is being performed, and no instruction is provided via the selection screen, perform control to display the virtual space image on the display of the head-mounted display.

13. The head-mounted display control apparatus according to claim 12, wherein execution of the stored instructions further configures the one or more processors to:

when it is determined that the received information output by the external apparatus indicates that a phone call is being received or a phone conversation is being performed, perform control to display an instruction button on the selection screen being displayed such that the instruction button is superimposed on the virtual space image, when it is determined that the received information output by the external apparatus indicates that a phone call is being received or a phone conversation is being performed, and an operation instruction for the instruction button is provided via the selection screen, perform control to display the captured image and the virtual space image on the display unit, and when a phone call is being received or a phone conversation is being performed, and no operation instruction for the instruction button is provided, perform control to display the virtual space image on the display unit.

14. A method for controlling a head-mounted display control apparatus that is in communication with an external apparatus, comprising:

capturing, via at least one camera of the head-mounted display control apparatus, an image of real-space; and receiving information output by the external apparatus;

determining if the output information represents any of a phone call reception information, phone conversation information, or message reception information;

performing control to display, on a display of the head-mounted display, a selection screen within a virtual space image that (i) includes options for starting or refusing a phone call, and switching ON or OFF a video see-through mode, and (ii) controls the at least one camera to begin capturing images of real space and suspend an application that is rendering the virtual space image.

15. A non-transitory computer readable storage medium storing instructions that, when executed by one or more processors of a head-mounted display control apparatus that is in communication with an external apparatus, configures the head-mounted display control apparatus to execute a process of:

capturing, via at least one camera of the head-mounted display control apparatus, an image of real-space; and receiving information output by the external apparatus;

determining if the output information represents any of a phone call reception information, phone conversation information, or message reception information;

performing control to display, on a display of the head-mounted display, a selection screen within a virtual space image that (i) includes options for starting or refusing a phone call, and switching ON or OFF a video see-through mode, and (ii) controls the at least one camera to begin capturing images of real space and suspend an application that is rendering the virtual space image.

* * * * *